Figure 1:
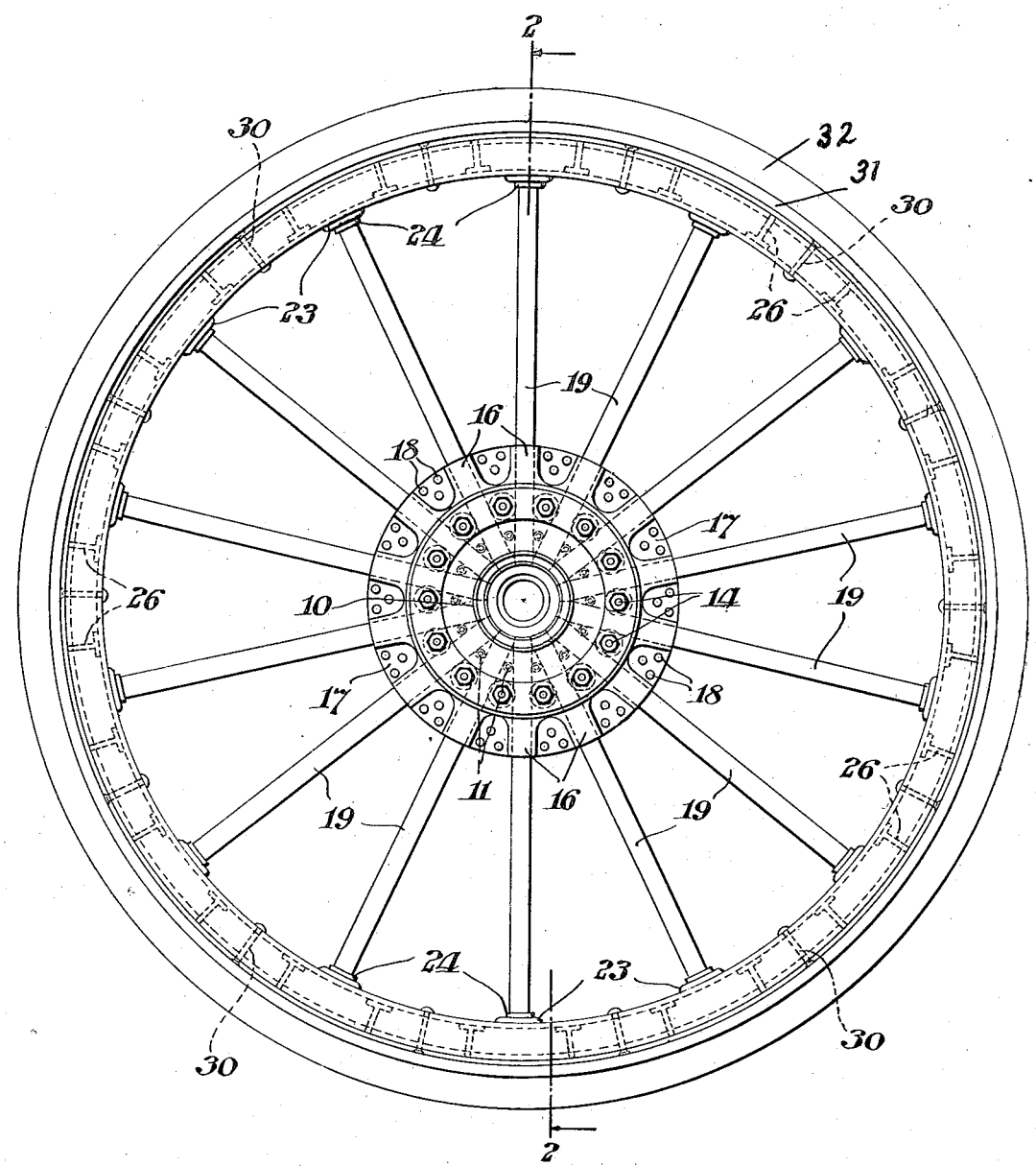

July 24, 1923.
L. FINE
METAL WHEEL
Filed Aug. 30, 1919
2 Sheets-Sheet 2
1,462,957
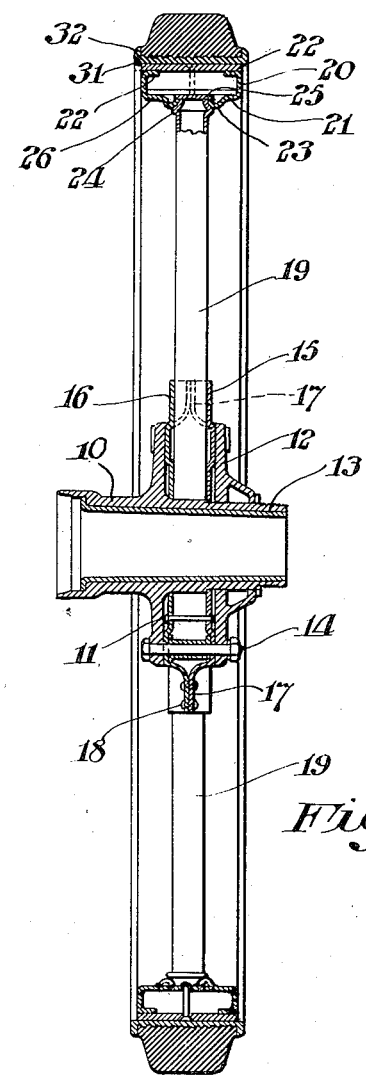
Fig.II.
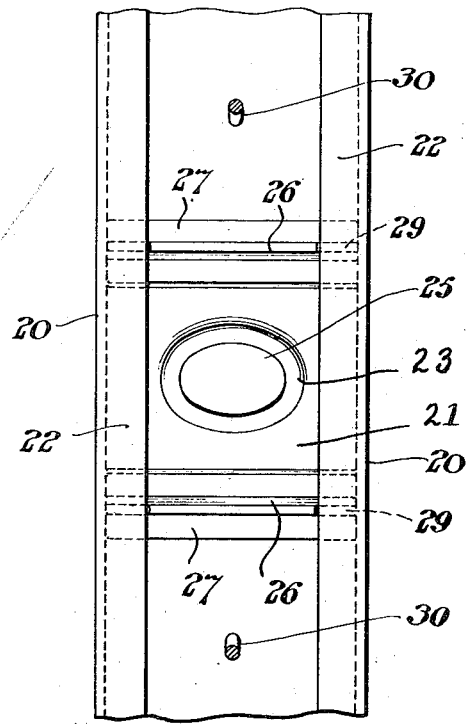
Fig.III.
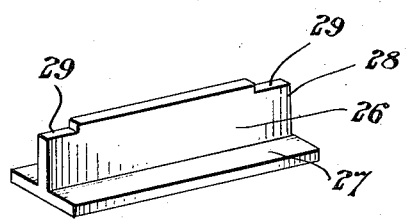
Fig.IV.
Inventor:
Lewis Fine,
By Chester H Braselton
Attorney.

Patented July 24, 1923.

1,462,957

UNITED STATES PATENT OFFICE.

LEWIS FINE, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

METAL WHEEL.

Application filed August 30, 1919. Serial No. 320,865.

*To all whom it may concern:*

Be it known that I, LEWIS FINE, residing at Philadelphia, county of Philadelphia, and State of Pennsylvania, have invented certain new and useful Improvements in Metal Wheels, of which I declare the following to be a full, clear, and exact description.

This invention relates to improvements in metal wheels.

One object of this invention is to provide an all-metal wheel construction which is particularly adapted to wheels of large diameter and using a wide rim.

Another object of this invention is to provide an all-metal wheel having a structural felloe mounted on the ends of the spokes and internally reinforced.

Further objects, and objects relating to details of construction and economies of production and operation, will definitely appear from the detailed description to follow. I accomplish the objects of my invention, in one instance, by the devices and means described in the following specification. My invention is clearly defined and pointed out in the appended claims. A structure constituting a preferred embodiment of my invention is illustrated in the accompanying drawing, forming a part of this specification, in which:

Figure I is a view in side elevation of a wheel embodying my invention.

Figure II is a transverse sectional view, taken on the line 2—2 of Figure I.

Figure III is a fragmentary plan view of a portion of the periphery of the wheel with the rim removed, and Figure IV is a perspective view of one of the felloe reinforcing members.

In the drawing, similar reference numerals refer to similar parts throughout the several views, and the sectional view is taken looking in the direction of the little arrows at the ends of the section line.

Considering the numbered parts of the drawing, I have shown a wheel comprising a hub 10 having a radially extending flange 11.

Another slip flange 12 is mounted on the hub 10 and adapted to be held thereon by a nut, screwed on the threaded part 13, and by the bolts 14. The side plates 15 and 16 clamp between them the oval tubular spokes 19, said plates 15 and 16 being pressed in towards each other, at 17, and connected by the rivets 18 at such points. Bolts 14 extend through the flanges 11 and 12, and the plates 15 and 16, between the spokes 19, and hold the parts clamped together.

A hollow felloe member is provided, comprising a sectional channel-shaped member having a base 21 and a pair of side walls 20, the outer edges of which are turned over parallel to the base and extend inwardly towards each other, forming the flanges 22. A plurality of openings are formed in the base 21 of the felloe and beads 23 are formed around each opening as shown in Figure II. The end of each of the spokes 19 is disposed in one of the openings and each spoke has a bead 24 formed thereon near its end and co-operating with the bead 23 to support the felloe on the ends of the spokes. Discs 25 are mounted on the edges of the beads 23 around the openings and on the ends of the spokes 19, and welded thereto so as to connect the spokes and felloe firmly together.

A plurality of T-bars 26 are mounted in the channel-shaped felloe member, each of said T-bars having a base 27 and a web 28 extending at right angles thereto. The ends of the upper edge of the web 28 have the seats or notches 29 formed therein. These T-bars are mounted in the channel-shaped felloe, between the spokes, with their bases 27 seated on and welded to the base 21 of the felloe, and the flanges 22 resting in the seats 29 formed in the webs 28, as clearly shown in Figure III. A felloe-band 31 is mounted on the periphery of the felloe, being seated on the flanges 22 and the edges of the webs 28, and being secured in place by rivets 30 extending through the base 21 of the felloe and through the felloe band and disposed between the T-bars. A suitable rim and tire 32 is mounted on the felloe band in the usual manner.

From the description of the parts given above, the operation of this device should be very readily understood. I have provided a wheel in which a hollow metal felloe is mounted on the ends of the spokes; and, in order to permit this felloe to adequately support a rim of suitable width such as is customarily used in the larger sized wheels, I have provided a series of transverse reinforcing members, or T-bars, 26 which adequately support the felloe-band and brace the felloe against side thrusts, with the result that I have an internally reinforced hollow felloe which is adequately braced to withstand shocks, but which is at the same time comparatively light.

I am aware that the particular embodiment of my invention, which I have here shown and described, is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:—

1. In a wheel the combination with a hub, a plurality of spokes radiating therefrom, and a metal channel mounted on the ends of said spokes and constituting a felloe, of a plurality of reinforcing members seated on the base of the channel between the spokes and extending transversely of the channel, a felloe-band supported by said reinforcing members, and fastening means extending between the felloe-band and the base of said channel between said reinforcing members.

2. In a wheel the combination with a hub, a plurality of spokes radiating therefrom, and a metal channel mounted on the ends of said spokes and constituting a felloe, of a plurality of bars seated on the base of said channel and extending transversely thereof, and a felloe-band on the periphery of said felloe supported by said bars.

3. In a wheel the combination with a hub, a plurality of spokes radiating therefrom, and a metal channel mounted on the ends of said spokes and constituting a felloe, of a plurality of T-bars seated in said channel and extending transversely thereof, and a felloe-band seated on the radially extending webs of said T-bars.

4. In a wheel the combination with a hub, a plurality of spokes radiating therefrom, and a metal channel mounted on the ends of said spokes and constituting a felloe, of a plurality of reinforcing members seated on and welded to the base of said channel and extending transversely thereof, and a felloe-band on the periphery of said felloe supported by said reinforcing members.

5. In a wheel the combination with a hub, a plurality of spokes radiating therefrom, and a metal channel mounted on the ends of said spokes and constituting a felloe, of a plurality of T-bars having their bases seated on and welded to the base of said channel and extending transversely thereof, and a felloe-band on the periphery of said felloe supported by the webs of said T-bars.

6. In a wheel the combination with a hub, a plurality of spokes radiating therefrom, and a continuous metal channel mounted on the ends of said spokes, the edges of the walls of said channel being bent laterally, parallel to the base, of a plurality of reinforcing members seating on said base and extending transversely of said channel, and a felloe-band mounted on the reinforcing members and said laterally turned edges.

7. In a wheel the combination with a hub, and a plurality of spokes radiating therefrom, of a continuous metal channel mounted on the ends of said spokes and constituting a felloe, a plurality of reinforcing members seated on the base of said channel and extending transversely thereof, the edges of the channel walls being bent laterally and overhanging the ends of said reinforcing members and a felloe-band on the periphery of said felloe supported by said reinforcing members and said laterally turned edges.

8. In a wheel the combination with a hub, a plurality of spokes radiating therefrom, and a continuous metal channel mounted on the ends of said spokes and constituting a felloe, of a plurality of felloe-band supports seated on and extending transversely of the base of said channel and having portions extending between the edges of the channel wall into line with said edges, and a felloe-band seated on said edges and said supports.

9. In a wheel the combination with a hub, a plurality of spokes radiating therefrom, and a metal channel mounted on the ends of said spokes and constituting a felloe, the edges of the side walls of said channel being turned laterally towards each other, of a plurality of T-bars seated on the base of said channel with their webs extending radially, said webs being notched at their ends to receive the inturned edges of said channel wall, and a felloe-band seated on the webs of said T-bars and said inturned edges.

In testimony whereof, I affix my signature.

LEWIS FINE.